Aug. 17, 1943.  A. R. THOMAS  2,326,900
REFRIGERATION
Filed Oct. 18, 1939
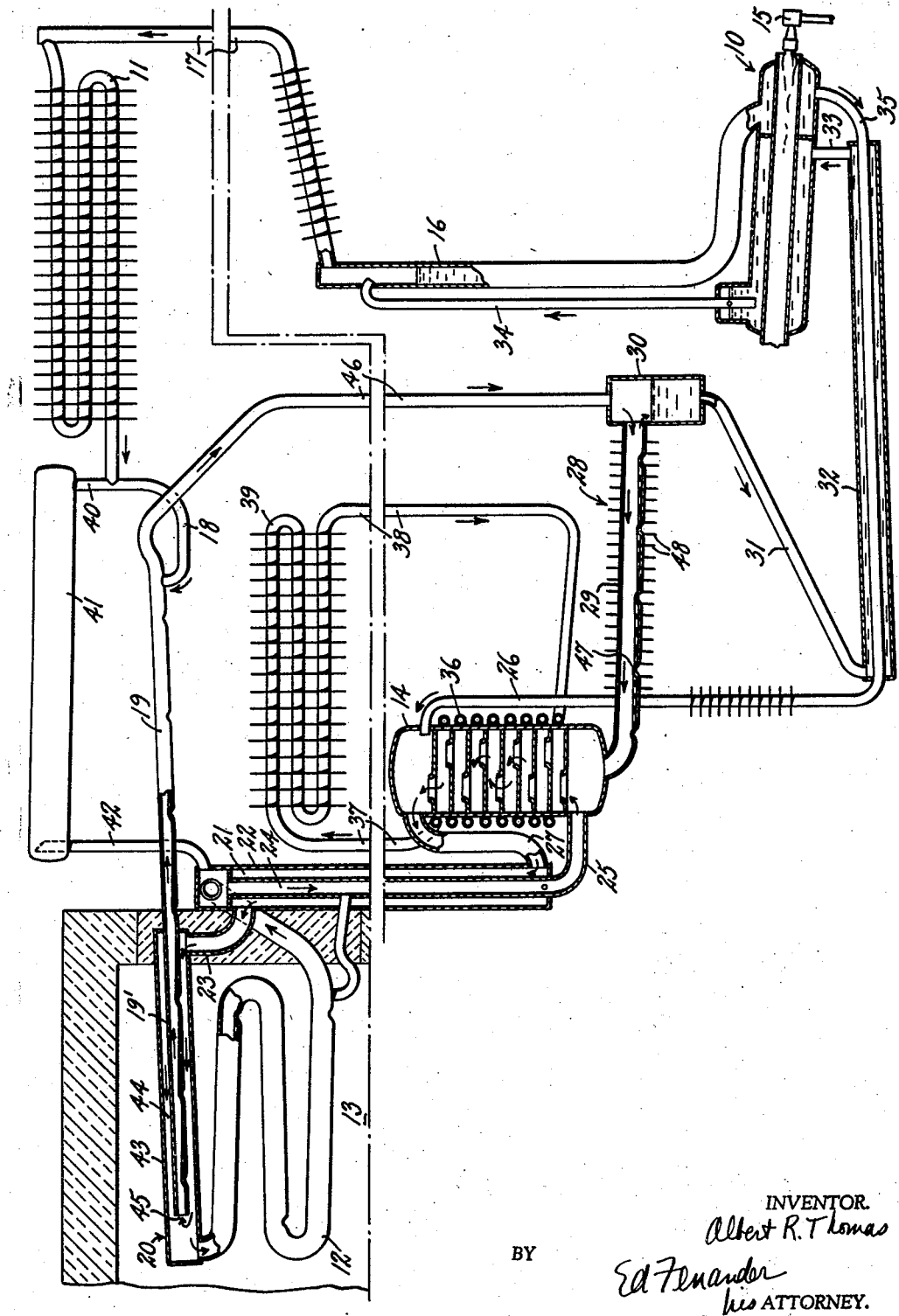
INVENTOR.
Albert R. Thomas
BY Ed Fernander
his ATTORNEY.

Patented Aug. 17, 1943

2,326,900

UNITED STATES PATENT OFFICE 2,326,900

REFRIGERATION

Albert R. Thomas, Evansville, Ind., assignor to Servel, Inc., New York, N. Y., a corporation of Delaware Application October 18, 1939, Serial No. 299,919

10 Claims. (Cl. 62—119.5)

This invention relates to refrigeration, and more particularly to a refrigeration system employing evaporation of refrigerant fluid in the presence of an inert gas or auxiliary agent.

It is an object of the invention to improve the operation of systems of this type, particularly to effect a lower refrigeration temperature. I accomplish this by flowing inert gas to an evaporator in a first path of flow which is in heat exchange relation with a second path of flow, and, after such inert gas has passed in heat exchange relation with the second path of flow, a part of the inert gas is diverted or bled off into the second path of flow wherein there takes place reevaporation of liquid refrigerant flowing to the evaporator. The first path of flow forms a part of a main circuit for circulating inert gas between the evaporator and the usual absorber, and the second path of flow constitutes a branch or auxiliary circuit for inert gas in which the diverted gas flows counter-current to the gas in the main circuit while in heat exchange relation therewith. The branch or auxiliary circuit may include a separate absorber into which absorption liquid is conducted from the usual absorber. With the circuit arrangement provided, effective precooling of liquid refrigerant and inert gas flowing to the evaporator is obtained to precool these fluids to the lowest possible temperature. Further, the provision of the separate absorber in the branch or auxiliary circuit increases the concentration of refrigerant in the enriched absorption liquid, thereby improving the efficiency of the refrigerating system.

The invention, together with the above and other objects and advantages thereof, will be more fully understood upon reference to the following description and accompanying drawing forming a part of this specification and in which the single figure illustrates more or less diagrammatically a refrigeration system embodying the invention.

In the drawing I have shown the present improvement embodied in an absorption refrigeration system of a type containing a pressure equalizing agent. Such a system includes a generator 10, condenser 11, a cooling unit 12 arranged in a thermally insulated storage space 13, and an absorber 14 which are interconnected in a manner well known in the art and which will briefly be described hereinafter. The system contains a solution of refrigerant in absorption liquid, such as ammonia in water, for example, and also an auxiliary agent or inert gas, such as hydrogen.

The generator 10 is heated in any suitable manner, as by a gas burner 15, for example, whereby refrigerant vapor is expelled from solution in generator 10. The refrigerant vapor flows upward through a stand pipe 16 and a conduit 17 into the condenser 11 in which it is liquefied. Liquid refrigerant flows from condenser 11 into cooling unit 12 through a conduit 18, a liquid precooler 19, and a gas and liquid precooler 20, as will be described presently.

Refrigerant fluid in cooling unit 12 evaporates and diffuses into inert gas which enters through conduit 23 and the gas and liquid precooler 20 from the upper end of an outer passage 21 of gas heat exchanger 22. Due to evaporation of refrigerant fluid into inert gas, a refrigerating effect is produced with consequent absorption of heat from the surroundings. The rich gas mixture of refrigerant vapor and inert gas formed in cooling unit 12 flows from the lower part thereof through an inner passage 24 of gas heat exchanger 22 and conduit 25 into the lower part of absorber 14.

In absorber 14 the rich gas mixture flows counter-current to downwardly flowing weak absorption liquid which enters through a conduit 26. The absorption liquid absorbs refrigerant vapor from the inert gas, and inert gas weak in refrigerant flows from absorber 14 through a conduit 27, outer passage 21 of gas heat exchanger 22, conduit 23, and the gas and liquid precooler 20 into the upper part of cooling unit 12.

The circulation of gas in the gas circuit just described is due to the difference in specific weight of the columns of rich and weak gas in the inner and outer passages 21 and 24, respectively, of the gas heat exchanger 22. Since the rich gas is heavier than the weak gas, a force is produced or developed for causing flow of rich gas toward absorber 14 and flow of weak gas toward cooling unit 12.

Absorption liquid enriched in refrigerant flows from the lower part of absorber 14 through an inclined horizontally extending conduit 29 into a vessel 30, and thence through a conduit 31, outer passage of a liquid heat exchanger 32 and conduit 33 into generator 10. Liquid is raised in the generator by a thermosiphon tube 34 and flows back to the generator through stand pipe 16. The refrigerant vapor expelled out of solution in generator 10, together with refrigerant vapor entering through thermosiphon tube 34, flows upwardly through stand pipe 16 and conduit 17 into the condenser 11, as explained above.

The absorption liquid from which refrigerant has been expelled flows from generator 10 through a conduit 35, inner passage of liquid heat exchanger 32, and conduit 26 to the upper part of absorber 14. This circulation of absorption liquid results from the raising of liquid by thermosiphon tube 34. Heat liberated with absorption of refrigerant vapor in absorber 14 is transferred to a suitable cooling medium which circulates through a coil 36 arranged in thermal exchange relation with the absorber. As shown, the coil 36 is connected by conduits 37 and 38 to an air-cooled condenser 39. The coil 36, condenser 39, and interconnecting conduits form a closed circuit which is partly filled with a volatile liquid that vaporizes in coil 36 and liquefies in condenser 39. The liquid evaporating in coil 36 takes up heat from absorber 14, and the vapor liquefying in condenser 39 gives up heat to surrounding air.

The lower end of condenser 11 is connected by a conduit 40, vessel 41, and conduit 42 to the gas circuit, so that any inert gas which may pass through the condenser can flow into the gas circuit. Refrigerant vapor not liquefied in the condenser flows through conduit 40 to displace inert gas in vessel 41 and force such gas through conduit 42 into the gas circuit. By forcing gas into the gas circuit in this manner, the total pressure in the system is raised whereby an adequate condensing pressure is obtained to insure condensation of refrigerant vapor in condenser 11.

In accordance with my invention, in order to obtain a lower temperature in cooling unit 12, I provide the gas and liquid precooler 20 and the liquid precooler 19. The gas and liquid precooler 20 includes a jacket 43 and the portion 19' of conduit 19 which is enveloped and surrounded by jacket 43. The portion of conduit 19 outside jacket 43 and extending to the connection of conduit 18 constitutes the liquid precooler.

The gas and liquid precooler 20 and liquid precooler 19 form part of a branch or auxiliary circuit into which gas weak in refrigerant and flowing in space 44 toward cooling unit 12 is diverted at 45 into the lower end of conduit portion 19'. This branch or auxiliary circuit also includes a conduit 46 which connects the upper end of conduit 19 and the upper part of vessel 30, the vessel 30, and the horizontally extending conduit 29 which is indented at spaced intervals to provide dams 47 and also provided with cooling fins 48. The conduit 29 with dams 47 and cooling fins 48 may be referred to as a separate absorber 28.

During operation, inert gas weak in refrigerant flows from absorber 14 through the outer passage 21 of gas heat exchanger 22 and conduit 23 into space 44 of jacket 43. The weak gas flows toward the left in space 44 toward cooling unit 12. At 45 a part of the weak gas flows into the lower open end of conduit portion 19' and the remainder flows into the upper part of cooling unit 12. Liquid refrigerant flowing downward in conduit 19 from condenser 11 evaporates and diffuses into the diverted or bled off gas with consequent absorption of heat, and, since the space 44 is in good heat exchange relation with the conduit portion 19' surrounded by jacket 43, heat is abstracted from weak gas flowing in space 44 toward cooling unit 12. Heat is also abstracted from liquid flowing in the conduit portion 19', and for this reason the precooler 20 has been referred to as a gas and liquid precooler.

The gas mixture formed in precooler 20 flows upward through the conduit portion 19 outside jacket 43. Since the partial pressure of refrigerant vapor in the gas mixture is less than the vapor pressure of the warm liquid refrigerant entering the upper end of conduit 19 through conduit 18, liquid refrigerant evaporates and diffuses into the gas mixture with consequent absorption of heat from the liquid refrigerant. Since only cooling of liquid takes place in the conduit portion 19 outside jacket 43, the conduit portion 19 has been referred to as a liquid precooler.

By precooling liquid refrigerant and weak gas before these fluids flow into the presence of each other in cooling unit 12, the temperature of cooling unit 12 is lowered. In the preferred embodiment of the invention which has been disclosed, the circuit arrangement is such that the temperature of the weak gas at 45, at the inlet end of the cooling unit 12, is the lowest possible. This may best be explained in the following manner. The temperature at which liquid evaporates and diffuses into weak gas at 45, at the gas inlet end of cooling unit 12, is dependent upon the partial pressure of refrigerant vapor in the weak gas. If no precooling of liquid and weak gas were effected, the temperature of these fluids would be considerably higher than the temperature at which evaporation of liquid takes place. As a result, with evaporation of liquid refrigerant, heat would be absorbed from the liquid and the gas to bring down the temperatures of these fluids. By precooling the liquid and weak gas, less of the refrigerating effect is employed to bring down the temperature of these fluids and a lower temperature is maintained in the cooling unit or evaporator.

In the present improvement weak gas having a relatively small partial pressure of refrigerant vapor flows into space 43 of precooler 20 from the absorber 14. Due to evaporation of liquid in conduit portion 19', heat is abstracted from this weak gas. It will be seen that weak gas is diverted or bled off into the branch circuit at 45 after the weak gas has been cooled in space 44, and the diverted gas flows counter-current to the main stream of weak gas in space 44. Hence, when the refrigerating system is started following a shut-down period, progressively cooler weak gas is diverted or bled off into the branch circuit on a regenerative principle of cooling. That is, as weak gas is being cooled in space 44, increasingly cooler weak gas is diverted at 45 into the conduit portion 19' of the branch circuit. With the weak gas entering the lower conduit portion 19 being progressively cooler, more heat is abstracted from the weak gas flowing in space 44 and from liquid flowing through conduit 19 into cooling unit 12.

After the refrigeration system has been operating for a sufficient length of time, so that the liquid precooler 19 and gas and liquid precooler 20 have established themselves, the temperature at 45, where the first evaporation of precooled liquid into precooled weak gas takes place, is the lowest possible with a given partial pressure of refrigerant vapor in the weak gas. That is, at equilibrium between the weak gas and liquid with the partial vapor pressure of the liquid and the partial vapor pressure of refrigerant in the weak gas the same, the cooling temperature at the start of evaporation corresponds with the saturation temperature of the weak gas. In other words, the weak gas flowing through conduit 23 and prior to entering precooler 20 has a partial vapor pressure of refrigerant and is at a relatively high temperature. If this weak gas were cooled until condensation of refrigerant vapor occurred, the weak gas would then be at its saturation temperature. With the circuit arrangement provided in this disclosure, the weak gas can be precooled towards the lowest possible temperature which corresponds with the saturation temperature of the weak gas. In the circuit arrangement provided, therefore, sufficient heat is abstracted from the weak gas and liquid in the liquid precooler 19 and the gas and liquid precooler 20, so that liquid and weak gas are substantially at the temperature at which liquid evaporates and diffuses into the gas at 45. Stated another way, effective precooling of liquid and weak gas is effected by the provision of the branch or auxiliary circuit so that these fluids do not need to be cooled at the inlet end of the evaporator or cooling unit, and the temperature at the start of evaporation is lowered as much as possible so that the mean temperature of the cooling unit or evaporator is lowered.

The conduit 18 is U-shaped at the region it is connected to conduit 19 to provide a liquid trap and thereby prevent gas in conduit 19 from flowing into the lower end of condenser 11. The heat removed from warm liquid in the liquid precooler 19 is relatively high in temperature and the partial pressure of refrigerant vapor in the gas mixture flowing through conduit 46 into vessel 30 is unusually high. By providing the separate absorber 28, refrigerant is absorbed out of the inert gas into absorption liquid flowing from absorber 14. With this arrangement, therefore, the concentration of refrigerant in the rich liquid flowing to generator 10 is increased above the usual concentration of refrigerant in absorption liquid when no branch or auxiliary circuit and separate absorber of the character shown are provided, thereby improving the efficiency of the refrigerating system.

Although a single embodiment of the invention has been shown and described, such variations and modifications are contemplated as fall within the true spirit and scope of the invention, as pointed out in the following claims.

What is claimed is:

1. In the art of refrigerating with a system employing inert gas into which liquid refrigerant evaporates, the improvement which consists in flowing inert gas to a place of evaporation in a first path of flow in heat exchange relation with a second path of flow, conducting liquid to said second path of flow, diverting gas from said first path of flow after such gas has passed in heat exchange relation with said second path of flow, and flowing the diverted gas into said second path of flow.

2. In the art of refrigerating with a system employing inert gas into which liquid refrigerant evaporates, the improvement which consists in flowing inert gas to a place of evaporation in a first path of flow in heat exchange relation with a second path of flow, diverting gas from said first path of flow into said second path of flow after the inert gas in said first path of flow has passed in heat exchange relation with the inert gas in said second path of flow, and conducting liquid in the portion of said second path of flow in heat exchange relation with said first path of flow and thence to said place of evaporation.

3. In the art of refrigerating with a system employing inert gas into which liquid refrigerant evaporates, the improvement which consists in flowing inert gas to a place of evaporation in a first path of flow in heat exchange relation with a second path of flow, conducting liquid to said second path of flow, bleeding off gas from said first path of flow after such gas has passed in heat exchange relation with said second path of flow, and flowing the bled off gas into said second path of flow counter-current to the gas flowing in said first path of flow.

4. In the art of refrigerating with a system employing inert gas into which liquid refrigerant evaporates, the improvement which consists in flowing inert gas to a place of evaporation in a first path of flow in heat exchange relation with a second path of flow, bleeding off gas from said first path of flow after such gas has passed in heat exchange relation with said second path of flow, flowing bled off gas into said second path of flow counter-current to the inert gas flowing in said first path of flow, and flowing liquid in said second path of flow counter-current to gas flowing therein and thence to said place of evaporation.

5. In the art of refrigerating with a system employing inert gas into which liquid refrigerant evaporates, the improvement which consists in flowing inert gas to a place of evaporation in a first path of flow in heat exchange relation with a second path of flow, bleeding off gas from said first path of flow after such gas has passed in heat exchange relation with said second path of flow, flowing bled off gas into said second path of flow counter-current to the inert gas in said first path of flow, flowing liquid in said second path of flow out of heat exchange relation with said gas in said first path of flow and then in heat exchange relation with said first path of flow, and conducting liquid from said second path of flow to said place of evaporation.

6. In a refrigerating system having a primary evaporator in which liquid refrigerant evaporates into an inert gas, an absorber, means for conducting absorption liquid to and from said absorber, means providing a main circuit for circulating an inert gas between said absorber and said main evaporator, the inert gas flowing to said absorber being rich in refrigerant vapor and the inert gas flowing to said primary evaporator being weak in refrigerant vapor, structure to provide an auxiliary evaporator in heat exchange relation with said main circuit and a circuit branched from said main circuit for circulating inert gas between said absorber and said auxiliary evaporator, and means including said structure for conducting liquid refrigerant to said primary evaporator, said structure being so constructed and arranged that gas from said main circuit flows in heat exchange relation with said auxiliary evaporator before entering said branch circuit whereby, with the weak gas and liquid refrigerant at equilibrium at the gas inlet of said main evaporator, the weak gas is precooled towards the lowest possible temperature which corresponds with the saturation temperature of the weak gas.

7. A refrigerating system having an evaporator in which liquid refrigerant evaporates into an inert gas, an absorber, a main circuit for circulating an inert gas between said absorber and said evaporator, said circuit including a pipe for conducting gas to said evaporator, a branch circuit for inert gas including a conduit, means including said conduit for conducting liquid refrigerant to said evaporator, said conduit having a portion out of heat exchange relation with said pipe and another portion disposed lengthwise within said pipe and having a discharge opening terminating at a region at or adjacent to said evaporator.

8. A refrigerating system having an evaporator in which liquid refrigerant evaporates into an inert gas, means including a pipe for conducting inert gas to said evaporator, and means including a conduit for conducting in the presence of each other liquid refrigerant to said evaporator and inert gas from said pipe, a portion of said conduit being enveloped by said pipe and another portion being disposed outside said pipe.

9. In a refrigerating system having a primary evaporator in which liquid refrigerant evaporates into an inert gas, a main absorber, conduit means for conducting absorption liquid to and from said main absorber, and means providing a main circuit for circulating an inert gas between said main absorber and said main evaporator, a branch circuit for inert gas including an auxiliary evaporator in heat exchange relation with said main circuit and a separate absorber, said conduit means for conducting absorption liquid from said main abosrber including said separate absorber, and means including said auxiliary evaporator for conducting liquid refrigerant to said main evaporator.

10. A refrigerating system having a main circuit for auxiliary gas including an evaporator and and absorber, a branch circuit for said gas including a second evaporator and a second absorber, said second evaporator being arranged in heat exchange relation with said first evaporator and connected for flow of liquid refrigerant therefrom to said first evaporator, and a still connected to said absorbers in a circuit for flow of absorption liquid therein countercurrent to flow of gas in the absorbers, and arranged to deliver liquid refrigerant to said second evaporator.

ALBERT R. THOMAS.